US010496253B2

(12) United States Patent
Keller

(10) Patent No.: US 10,496,253 B2
(45) Date of Patent: Dec. 3, 2019

(54) TREE-DIAGRAM DESIGN INTERFACE PROCESSES FOR CREATING SURVEYS, SIMULATIONS, AND INTELLIGENT TUTORING SYSTEMS

(71) Applicant: Daniel Alan Keller, Portland, OR (US)

(72) Inventor: Daniel Alan Keller, Portland, OR (US)

( * ) Notice: Subject to any disclaimer, the term of this patent is extended or adjusted under 35 U.S.C. 154(b) by 164 days.

(21) Appl. No.: 15/689,298

(22) Filed: Aug. 29, 2017

(65) Prior Publication Data

US 2019/0065017 A1 Feb. 28, 2019

Related U.S. Application Data

(60) Provisional application No. 62/398,968, filed on Sep. 23, 2016.

(51) Int. Cl.
| | |
|---|---|
| *G06F 3/00* | (2006.01) |
| *G06F 3/0484* | (2013.01) |
| *G06T 11/20* | (2006.01) |
| *G09B 7/077* | (2006.01) |
| *G09B 5/02* | (2006.01) |
| *G06F 3/048* | (2013.01) |
| *G06F 3/0481* | (2013.01) |
| *G09B 19/00* | (2006.01) |

(52) U.S. Cl.
CPC ............ *G06F 3/0484* (2013.01); *G06F 3/048* (2013.01); *G06F 3/0481* (2013.01); *G06T 11/206* (2013.01); *G09B 5/02* (2013.01); *G09B 7/077* (2013.01); *G06F 3/04817* (2013.01); *G09B 19/0053* (2013.01)

(58) Field of Classification Search
CPC .... G06F 3/048; G06F 3/0481; G06F 3/04817; G06F 3/0484
See application file for complete search history.

(56) References Cited

U.S. PATENT DOCUMENTS

| | | | | |
|---|---|---|---|---|
| 5,797,135 A | * | 8/1998 | Whalen | .................... G06N 5/02 706/53 |
| 6,334,192 B1 | * | 12/2001 | Karpf | ..................... G06Q 50/22 714/1 |
| 9,529,836 B1 | * | 12/2016 | Hale | .................... G06F 16/2237 |
| 2003/0050939 A1 | * | 3/2003 | Dietz | .................. G06F 17/2211 |
| 2010/0030712 A1 | * | 2/2010 | Passovoy | ................. G06N 5/04 706/11 |
| 2011/0010202 A1 | * | 1/2011 | Neale | ..................... G06N 5/025 705/4 |

(Continued)

*Primary Examiner* — Kieu D Vu
*Assistant Examiner* — Andrew Chung
(74) *Attorney, Agent, or Firm* — Plager Schack LLP; Mark H. Plager; Stephen Hallberg

(57) ABSTRACT

Tree-diagram design interface processes for creating surveys, simulations, and intelligent tutoring systems are disclosed. The tree-diagram design interface processes create surveys, simulations, and intelligent tutoring systems in a highly intuitive manner that can be nearly universally understood with minimal instruction. Moreover, the tree-diagram design interface utilizes an easily understood 1:1 ratio of inputs between graphical elements in the design interface and actual elements of the survey, simulation, or intelligent tutoring system, whereby each input in the design phase has a clear and identical output in the survey, simulation, or intelligent tutoring system itself.

10 Claims, 8 Drawing Sheets

(56) References Cited

U.S. PATENT DOCUMENTS

| | | | |
|---|---|---|---|
| 2014/0281879 A1* | 9/2014 | Lukes | G06F 16/958 715/234 |
| 2014/0282013 A1* | 9/2014 | Amijee | G06F 16/4393 715/732 |
| 2015/0160811 A1* | 6/2015 | Shah | G06F 17/24 715/855 |
| 2015/0254214 A1* | 9/2015 | Rosenberg | G09B 5/06 715/202 |
| 2016/0055533 A1* | 2/2016 | Tanio | G06Q 50/12 705/14.45 |
| 2016/0148097 A1* | 5/2016 | Genova, III | G06F 3/0484 706/47 |
| 2016/0342678 A1* | 11/2016 | Newman | G06F 3/0484 |
| 2017/0242667 A1* | 8/2017 | Kotman | G06F 8/35 |
| 2018/0114275 A1* | 4/2018 | Wang | G06Q 40/123 |

* cited by examiner

TREE-DIAGRAM DESIGN INTERFACE PROCESSES FOR CREATING SURVEYS, SIMULATIONS, AND INTELLIGENT TUTORING SYSTEMS

CLAIM OF BENEFIT TO PRIOR APPLICATION

This application claims benefit to U.S. Provisional Patent Application 62/398,968, entitled "A two-dimensional mind map-like interface for creating branch logic simulations and intelligent tutoring systems," filed Sep. 23, 2016. The U.S. Provisional Patent Application 62/398,968 is incorporated herein by reference.

BACKGROUND

Embodiments of the invention described in this specification relate generally to methods of creating survey, simulation, and other content, and more particularly, to tree-diagram design interface processes for creating surveys, simulations, and intelligent tutoring systems.

Surveys, educational simulations, and intelligent tutoring systems (ITS) that are responsive to the choices of individual students are widely recognized to facilitate differentiated and deep learning, yet they are very technically demanding and time-intensive to create, which has limited the scope of their creation and use.

Very few products or systems exist to design surveys, simulations, and intelligent tutoring systems, and those that do exist either require significant technical expertise, or they use a non-intuitive design interface. The existing systems used to create surveys, simulations, and intelligent tutoring systems are simply too complex and/or time-intensive for a person with average computer skills to use. As a result many people are largely excluded from the process of creating surveys, simulations, and intelligent tutoring systems. In an educational context, the consequence of this is that existing surveys, simulations, and intelligent tutoring systems are often not as relevant to an educator's goals as what they could create for themselves.

Therefore, what is needed is a way to use a highly intuitive tree-diagram design interface that can be nearly universally understood with minimal instruction. Moreover, my invention utilizes an easily understood 1:1 ratio of inputs in the design interface to elements in the actual survey, simulation, or intelligent tutoring systems, whereby each input in the design phase has a clear and identical output in the survey, simulation, or intelligent tutoring systems.

BRIEF DESCRIPTION

Embodiments of the invention disclosed herein include novel tree-diagram design interface processes for creating surveys, simulations, and intelligent tutoring systems. In some embodiments, the tree-diagram design interface processes include (i) a survey, simulation, and ITS tree-diagram creation process for creating a new tree diagram of at least one of a survey, a simulation, and an intelligent tutoring system, (ii) a survey, simulation, and ITS tree-diagram modification process for updating an existing tree diagram of at least one of a survey, a simulation, and an intelligent tutoring system, (iii) a user runtime tree-diagram navigation process for a user interacting with an existing tree-diagram associated with one of a survey, a simulation, and an intelligent tutoring system, and (iv) a server-side runtime tree-diagram navigation process for navigating an existing tree-diagram in response to a user interacting with one of a survey, a simulation, and an intelligent tutoring system.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
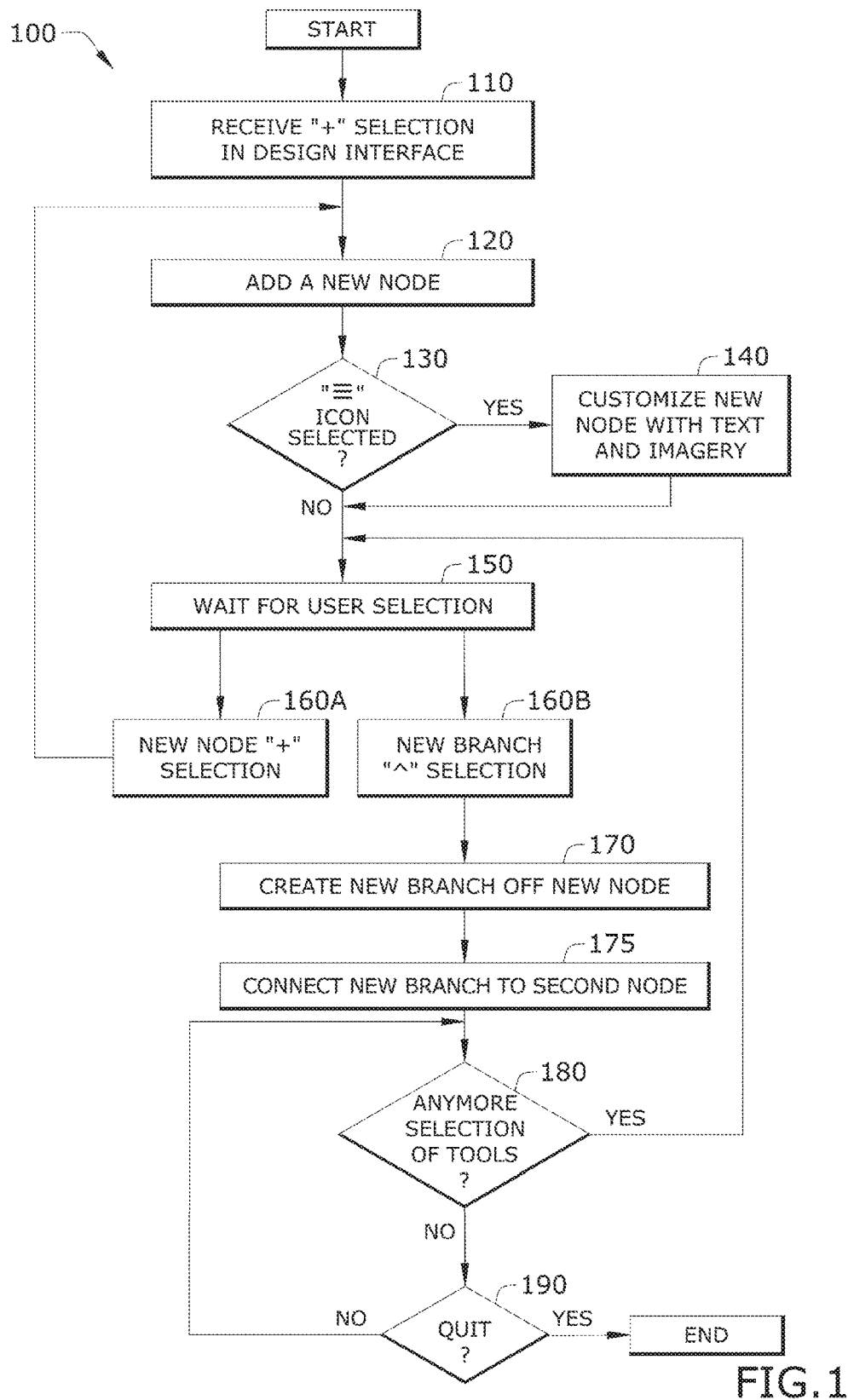
FIG. 1 conceptually illustrates a survey, simulation, and ITS tree-diagram creation process in some embodiments for creating a new tree diagram of at least one of a survey, a simulation, and an intelligent tutoring system.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include novel tree-diagram design interface processes for creating surveys, simulations, and intelligent tutoring systems.

As stated above, differentiated and deep learning are understood to be facilitated by surveys, educational simulations, and intelligent tutoring systems that are responsive to the choices of students. However, most such responsive surveys, simulations, and/or intelligent tutoring systems are very technically demanding and time-intensive to create. Unfortunately, the technical hurdles and time demands have limited the scope of their creation and use. While a few existing products and systems are available to design surveys, simulations, and intelligent tutoring systems, the choices are not satisfactory. In particular, the existing products and systems either require significant technical expertise or provide non-intuitive design interfaces, thus, making them too complex and/or time-intensive for a person with average computer skills to use. This has been an ongoing problem in an educational context, to the extent that existing surveys, simulations, and intelligent tutoring systems are often not as relevant to an educator's goals as what they could create for themselves.

Embodiments of the tree-diagram design interface system and processes described in this specification solve such problems by employing a highly intuitive, tree-diagram design interface that can be nearly universally understood with minimal instruction. In some embodiments, the tree-diagram design interface system and processes utilize an easily understood 1:1 ratio of inputs in the design interface to elements in the survey, simulation, or intelligent tutoring system, whereby each input in the design phase has an identical output in the survey, simulation or intelligent tutoring system.

Embodiments of the tree-diagram design interface system and processes described in this specification differ from and improve upon currently existing options. In particular, the most similar product (i.e., a mind map) to the tree-diagram design interface system and processes described in this specification is quite dissimilar to the embodiments of the tree-diagram design interface system and processes described in this disclosure. Specifically, a mind map is a static end-product, whereas the tree-diagram design interface system and processes of this specification simply use mind map-like interfaces to design surveys, simulations, and intelligent tutoring systems. That is, logically based mind maps are like tree-diagrams.

Also, in terms of survey, simulation and intelligent tutoring system creation tools, there is nothing like the tree-diagram design interface system and processes described in this specification. Many of the existing systems used to create surveys, simulations, and intelligent tutoring systems do function, but they typically use tables, matrices, and similarly complex design processes (e.g., native code or linear stacks of pages) to create the conditions of a survey, a simulation, or an intelligent tutoring system, and are hampered by their technical nature and inherently taxing design process. In contrast, the tree-diagram design interface system and processes described in this specification uses a highly intuitive tree-diagram design interface that can be nearly universally understood with minimal instruction. Moreover, some embodiments of the tree-diagram design interface system and processes utilize an easily understood 1:1 ratio of inputs in the design interface to elements in the actual survey, simulation, or intelligent tutoring system, whereby each input in the design phase has a clear and identical output in the survey, simulation, or intelligent tutoring system. Overall, the tree-diagram design interface system and processes described in this specification ends up facilitating the creation of two-dimensional maps that outline the scope and logical connections inherent in a given domain. Each simulation, as designed and observed in the design interface, can be considered a unique creation unto itself (i.e., a stand-alone tree-diagram).

Several more detailed embodiments are described in the sections below. Section I describes some examples of tree diagram design interface processes for creating and modifying surveys, simulations, and intelligent tutoring systems. Section II describes some example processes of using the tree-diagram design interface. Section III describes example graphical user interface (GUI) of the tree-diagram design interface during creation of a new tree diagram for a survey, a simulation, or an intelligent tutoring system. Section IV describes an electronic system that implements some embodiments of the invention.

I. Tree Diagram Design Interface Processes for Creating and Modifying Surveys, Simulations, and Intelligent Tutoring Systems In some embodiments, the tree-diagram design interface processes for creating surveys, simulations, and intelligent tutoring systems include (i) a survey, simulation, and ITS tree-diagram creation process for creating a new tree diagram of at least one of a survey, a simulation, and an intelligent tutoring system, (ii) a survey, simulation, and ITS tree-diagram modification process for updating an existing tree diagram of at least one of a survey, a simulation, and an intelligent tutoring system, (iii) a user runtime tree-diagram navigation process for a user interacting with an existing tree-diagram associated with one of a survey, a simulation, and an intelligent tutoring system, and (iv) a server-side runtime tree-diagram navigation process for navigating an existing tree-diagram in response to a user interacting with one of a survey, a simulation, and an intelligent tutoring system.

By way of example, FIG. 1 conceptually illustrates a survey, simulation, and ITS tree-diagram creation process 100 for creating a new tree diagram of at least one of a survey, a simulation, and an intelligent tutoring system. As shown in this figure, the survey, simulation, and ITS tree-diagram creation process 100 starts with a user (e.g., a teacher, an educator, a designer, a content creator, etc.) engaging and interacting with a survey, simulation, and ITS software application that implements the survey, simulation, and ITS tree-diagram creation process 100 and which provides a tree-diagram design interface. Specifically, the survey, simulation, and ITS tree-diagram creation process 100 starts by receiving (at 110) a selection of a tool to create a new node in the design interface. In some embodiments, the design interface includes a plurality of icons associated with a plurality of tools for creating, modifying, and publishing surveys, simulations, intelligent tutoring systems, including a "+" icon associated with a tool for creating a new node of a tree diagram corresponding to a specific survey, simulation, or intelligent tutoring system. In some embodiments, the plurality of icons further include a "=" icon associated with a customization tool and a "^" icon associated with a branch creation tool.

In some embodiments, the survey, simulation, and ITS tree-diagram creation process 100 adds (at 120) a new node for a tree diagram in response to the selection of the "+" icon to create a new node in the design interface. When the new node is the first node of a new tree diagram, then the survey, simulation, and ITS tree-diagram creation process 100 creates an initial new node and adds it to the design interface. The initial new node is a starting point for a new tree diagram, and all subsequent nodes, branches, and other features (e.g., customization of nodes) are added to the tree diagram in a direct or indirect relationship with the initial node.

After the initial new node is created (e.g., by selection of the "+" icon/tool for creating a new node), the survey, simulation, and ITS tree-diagram creation process 100 determines (at 130) whether to customize the newly created node in response to a selection of a node customization tool. For example, the new node may be displayed with a "=" icon and the survey, simulation, and ITS tree-diagram creation process 100 may detect a selection of the "=" icon/tool, signaling the user's intent to customize one or more properties or appearances of the new node (e.g., custom text, custom imagery, etc.). When selection of the new node customization tool is affirmatively selected, the survey, simulation, and ITS tree-diagram creation process 100 then customizes (at 140) the new node with text and/or imagery. For example, the user provides a node name, or an image to display on the node. Then the survey, simulation, and ITS tree-diagram creation process 100 waits (at 150) for the user to make a selection, which is described further below.

Referring back to the determination (at 130), when selection of the new node customization tool is not detected, then the survey, simulation, and ITS tree-diagram creation process 100 waits (at 150) for a user selection of a tool to continue building the tree diagram for the survey, the simulation, or the intelligent tutoring system. Since customization of the new node is either completed or skipped in the prior steps, the user can make the selection from the remaining tools, namely, the "+" icon associated with the node creation tool (at 160A) and the "^" icon associated with the branch creation tool (at 160B). When the user selects the "+" icon associated with the node creation tool (at 160A), the survey, simulation, and ITS tree-diagram creation process 100 transitions back to adding a second node (at 120), and proceeds as above.

On the other hand, when the user selects the "^" icon associated with the branch creation tool (at 160B), then the survey, simulation, and ITS tree-diagram creation process 100 creates (at 170) a new branch off the new node. Next, the survey, simulation, and ITS tree-diagram creation process 100 connects (at 175) the new branch to the second node. In this manner, the tree diagram starts to display some structure for whatever logic sequence is related to the survey, simulation, or intelligent tutoring system.

In some embodiments, the survey, simulation, and ITS tree-diagram creation process 100 then determines (at 180) whether the user is making any more selections of tools in the design interface. When the user will make more tool selections from the design interface, then the survey, simulation, and ITS tree-diagram creation process 100 transitions back to waiting for the user to make a selection of a tool (at 150), which is described in greater detail above. On the other hand, when no more tool selections are going to be made by the user for this tree diagram, then the survey, simulation, and ITS tree-diagram creation process 100 determines (at 190) whether the user wants to quit using the design interface for this tree diagram. When the user wants to continue using the design interface, then the survey, simulation, and ITS tree-diagram creation process 100 transitions back to determining (at 180) whether there are any more tool selections forthcoming. On the other hand, when the user does not want to continue, then the survey, simulation, and ITS tree-diagram creation process 100 ends.

To be sure, the user may have selected a previously created node and then selected the "^" icon to create a new branch. However, for consistency in the description of the survey, simulation, and ITS tree-diagram creation process 100, this example assumes that the initial new node was created for a new tree diagram associated with a survey, a simulation, or an intelligent tutoring system.

Figure 2:
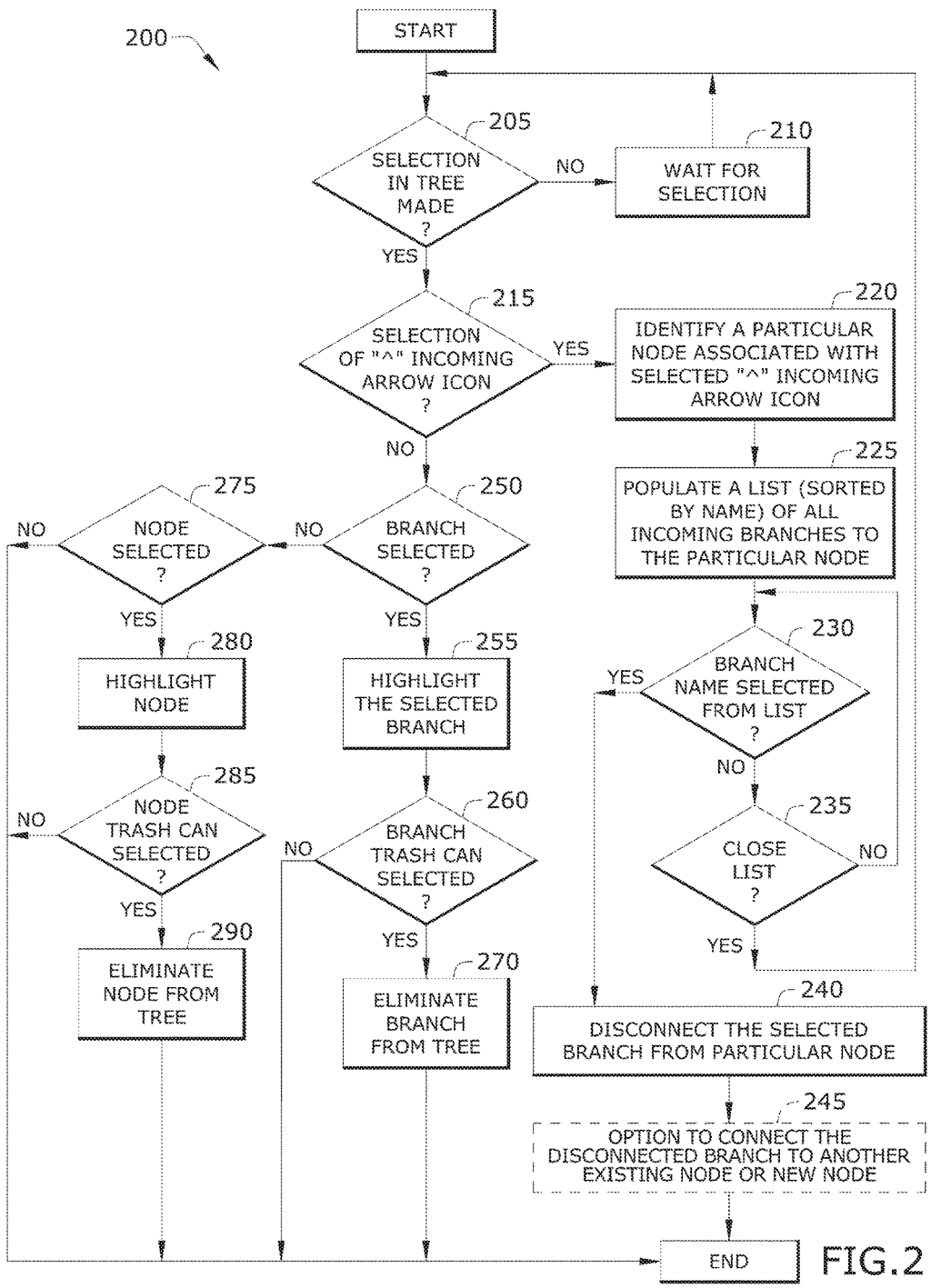
FIG. 2 conceptually illustrates a survey, simulation, and ITS tree-diagram modification process in some embodiments for updating an existing tree diagram of at least one of a survey, a simulation, and an intelligent tutoring system.

Another tree-diagram design interface process is described now by reference to FIG. 2, which conceptually illustrates a survey, simulation, and ITS tree-diagram modification process 200 for updating an existing tree diagram of at least one of a survey, a simulation, and an intelligent tutoring system. As shown in this figure, the survey, simulation, and ITS tree-diagram modification process 200 starts with an existing tree diagram already opened in the design interface of the software application. In some embodiments, the survey, simulation, and ITS tree-diagram modification process 200 determines (at 205) whether a selection in the existing tree diagram is made. When there is no selection in the existing tree, then the survey, simulation, and ITS tree-diagram modification process 200 waits (at 210) for a selection and returns backs to determining (at 205) whether a selection in the existing tree diagram is made.

On the other hand, when a selection in the tree is detected, the survey, simulation, and ITS tree-diagram modification process 200 determines (at 215) whether the selection is made of an incoming arrow icon (e.g., "^"). The survey, simulation, and ITS tree-diagram modification process 200 identifies (at 220) a particular node associated with the selected "^" incoming arrow icon. Next, the survey, simulation, and ITS tree-diagram modification process 200 populates (at 225) a list (sorted by name) of all incoming branches to the particular node. In some embodiments, the survey, simulation, and ITS tree-diagram modification process 200 then determines (at 230) whether a branch name is selected from the list. When a name has not been selected, the survey, simulation, and ITS tree-diagram modification process 200 determines (at 235) whether to close the list or keep it open. When the list stays open, the survey, simulation, and ITS tree-diagram modification process 200 then transitions back to the determination (at 230) of whether a branch name is selected from the list. However, when the list is closed, then the survey, simulation, and ITS tree-diagram modification process 200 returns back to the determination (at 205) of whether a selection in the tree is made. In essence, the user is starting from the full tree again and may select any type of tree element.

Referring back to the determination (at 230) of whether a branch name is selected from the list, when the user selects a particular branch name, then the survey, simulation, and ITS tree-diagram modification process 200 disconnects (at 240) the selected branch from the particular node. The survey, simulation, and ITS tree-diagram modification process 200 optionally connects (at 245) the disconnected branch to another existing node or new node. Then the survey, simulation, and ITS tree-diagram modification process 200 ends.

Turning back to whether the selection is made of an incoming arrow icon (e.g., "^"), when the selection is not the incoming arrow, then the survey, simulation, and ITS tree-diagram modification process 200 determines (at 250) whether a branch is selected. When a branch is not selected, the survey, simulation, and ITS tree-diagram modification process 200 determines (at 275) whether a node is selected, which is described further below.

On the other hand, when a branch is affirmatively determined to be selected, then the survey, simulation, and ITS tree-diagram modification process 200 highlights (at 255) the selected branch. With the selected branch highlighted, the survey, simulation, and ITS tree-diagram modification process 200 of some embodiments determines (at 260) whether a branch trash can icon is selected. When the branch trash can icon is not selected, the survey, simulation, and ITS tree-diagram modification process 200 ends. However, when the branch trash can icon is affirmatively determined to be selected, then the survey, simulation, and ITS tree-diagram modification process 200 eliminates (at 270) the highlighted branch from the tree. Then the survey, simulation, and ITS tree-diagram modification process 200 ends.

Referring back to the determination (at 250) of whether a branch is selected, when a branch is not selected, then the survey, simulation, and ITS tree-diagram modification process 200 determines (at 275) whether a node is selected. In some embodiments, the survey, simulation, and ITS tree-diagram modification process 200 ends when a node is not selected. When a node is determined to be selected, however, the survey, simulation, and ITS tree-diagram modification process 200 of some embodiments highlights (at 280) the node. Next, the survey, simulation, and ITS tree-diagram modification process 200 determines (at 285) whether a node trash can icon is selected. When the node trash can icon is not selected, the survey, simulation, and ITS tree-diagram modification process 200 ends. When the node trash can icon is affirmatively selected, however, then the survey, simulation, and ITS tree-diagram modification process 200 eliminates (at 290) the highlighted node from the tree. Then the survey, simulation, and ITS tree-diagram modification process 200 ends.

The tree-diagram design interface system and processes of the present disclosure may be comprised of the following elements. This list of possible constituent elements is intended to be exemplary only and it is not intended that this list be used to limit the tree-diagram design interface system and processes of the present application to just these elements. Persons having ordinary skill in the art relevant to the present disclosure may understand there to be equivalent elements that may be substituted within the present disclosure without changing the essential function or operation of the tree-diagram design interface system and processes.

1. A modern computer, tablet or smart phone
2. A tree-diagram design interface that uses branches and nodes as questions/prompts and response options, respectively.
3. Stock imagery used to supplement the surveys, simulations, and intelligent tutoring systems.
4. The surveys, simulations, and intelligent tutoring systems themselves, which are page by page displays of information, the sequence of which is determined in response to user input (i.e., following a particular trajectory within the larger array of possible options/choices).
5. A searchable online database of published surveys, simulations, and intelligent tutoring systems (all users have the ability to create and publish simulations and intelligent tutoring systems to a shared repository)
6. A two-dimensional traced representation of the path a given user has followed (the structure, minus the traced component, is identical to the design of the survey, simulation, or intelligent tutoring systems as seen in the design interface)

The tree-diagram design interface system and processes of the present disclosure generally work by way of two primary functions, the first of which is creating surveys, simulations, and intelligent tutoring systems, and the second of which is using surveys, simulations, and intelligent tutoring systems. With regard to the first primary function of creating surveys, simulations, and intelligent tutoring systems, the tree-diagram design interface system processes are implemented as software application modules, which collectively are organized together into a tree-diagram design interface software application (or "app") that uses a highly intuitive tree-diagram design interface consisting of branches and nodes. Nodes are editable and encompass all of the content related to a question or prompt, such as the question or prompt itself, choices of stock imagery to accompany the question or prompt, and font modification tools in the form of text style and color. Branches both stem from and connect to nodes (any given node can accommodate nearly an infinite number of incoming and outgoing branches) and branches, which are editable in terms of angle and length, and include the text for response options. Examples of processes for creating and modifying tree diagrams are described above, by reference to FIGS. 1-2.

As noted above, the tree-diagram design interface system and processes utilize an easily understood 1:1 ratio of inputs in the tree-diagram design interface to elements in the actual survey, simulation, or intelligent tutoring system, whereby each input in the design phase has a clear and identical output in the survey, simulation, or intelligent tutoring system itself. From an end user's perspective, using a survey, a simulation, or an intelligent tutoring system is similar to a "choose your own adventure" story or similarly responsive format, allowing an end user to follow a unique path through the survey, the simulation, or the intelligent tutoring system according to their decisions, as presented to them via logically linked page-by-page questions/prompts. Anyone who designs a survey, a simulation, or an intelligent tutoring system can choose to keep it stored locally on their device, or publish it to a shared library of surveys, simulations, and intelligent tutoring systems. In turn, end users can access any survey, simulation, or intelligent tutoring system that has been published to the shared library by using a series of standard search terms (e.g., titles, tags, key words, names of authors, etc.).

When the tree-diagram design interface system processes are implemented as a tree-diagram design interface software application (or "app"), and after the app has been installed on a smart phone or tablet as a mobile app, or accessed via a website as a web app, the user then determines whether to create or simply use a survey, simulation, or intelligent tutoring system. In the process of creating a survey, simulation, or intelligent tutoring system, the designer uses the basic principle of branch logic (as in a tree diagram) to map out questions/prompts (expressed as nodes) and their respective outcomes (expressed as branches), until the entire scope of interrelated questions/prompts and responses has been mapped. These inputs in the design interface translate directly to the questions/prompts and response options an end-user will experience when using a survey, simulation, or intelligent tutoring system. The only step involved in translating a survey, simulation, or intelligent tutoring system from the design interface to the user interface is saving it (the save function of the design interface creates a 1:1 correspondence from the design interface of branches and nodes to the user interface of page by page questions/prompts and response options).

Some embodiments of the tree-diagram design interface system and processes rely heavily on branch-logic. The tree-diagram design interface is a system for mapping out a set of instructions for the creation of surveys, simulations, or intelligent tutoring systems in the context of logically connected nodes and branches. The surveys, simulations, and intelligent tutoring systems produced in the design interface provide the instructions for how the survey, simulation, or intelligent tutoring systems should function for end users.

To make the tree-diagram design interface system and processes of the present disclosure, a person would design, encode, and compile the app or a similar piece of software. Whether the person or another person is involved, or a team of software developers, someone would need to program the software in a manner that reflects all of the tasks outlined above, including at least: a tree-diagram design interface that utilizes the intuitive structure of branches and nodes to create surveys, simulations, and intelligent tutoring systems; a searchable online repository of published surveys, simulations, and intelligent tutoring systems; and a visually engaging end-user interface to present the surveys, simulations, and intelligent tutoring systems as they were designed in the design interface via a page-by-page progression.

In some embodiments, the design interface of nodes and branches is re-configurable in such a way that only nodes convey information (i.e., all of the questions/prompts and response options would be integrated into the nodes of the tree-diagram), while branches are simply structural in function (i.e., being used to connect nodes to one another). Additionally, in terms of the user interface, it is possible to employ virtual reality or similar advanced imaging technology to create a more visually intensive, and perhaps realistic, way of experiencing the page to page transitions in accordance with one's choices.

II. Using the Tree-Diagram Design Interface

To use the tree-diagram design interface system and processes of the present disclosure, a person would plan to create a survey, a simulation, and/or an intelligent tutoring system. The tree-diagram design interface system especially facilitate the intuitive and quick creation of such surveys, simulations, and intelligent tutoring systems. However, some end users will only engage in the published survey, simulation, or intelligent tutoring system. In this section, processes are described for operations related to users interacting with previously created surveys, simulations, and/or intelligent tutoring systems.

Figure 3:
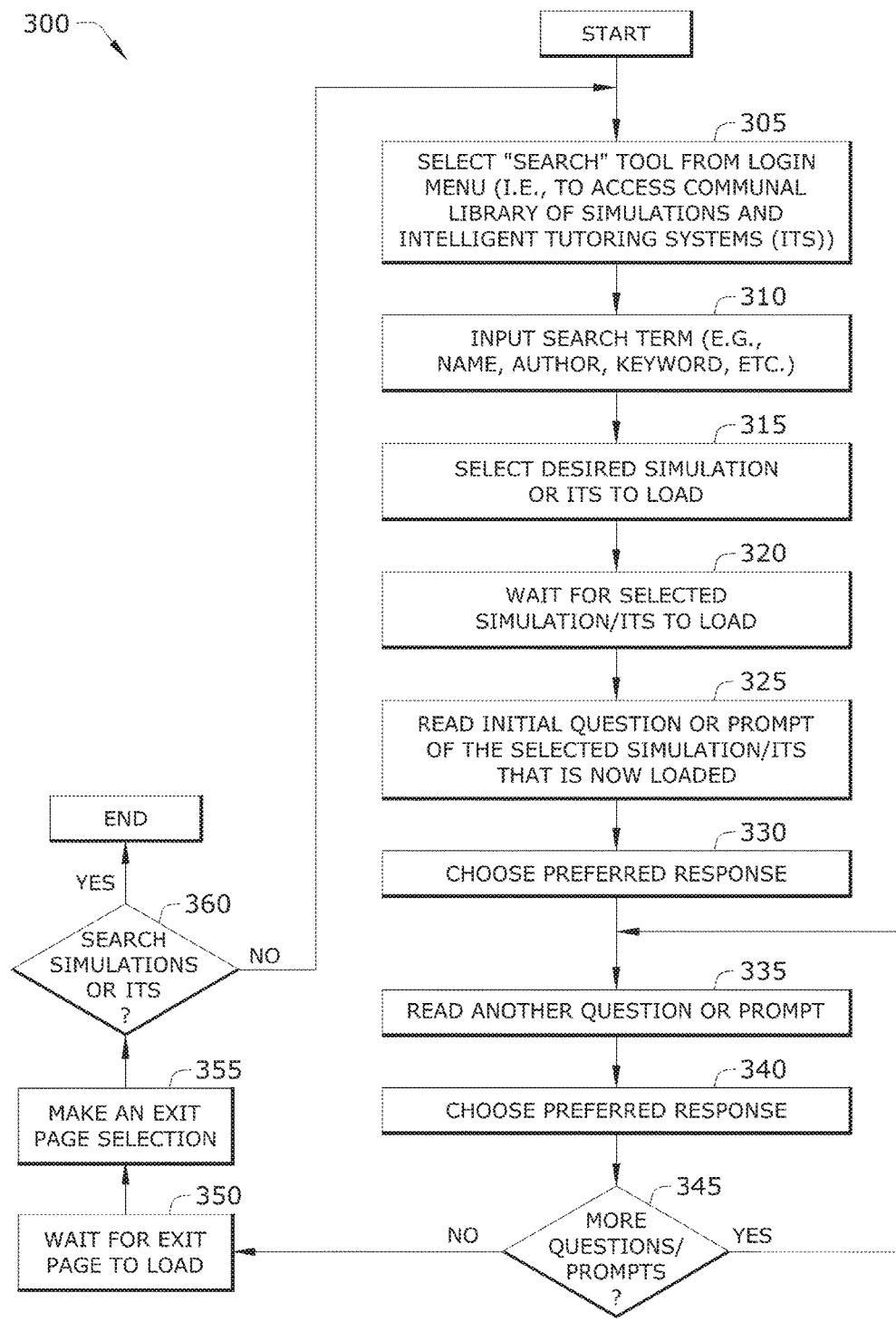
FIG. 3 conceptually illustrates a user runtime tree-diagram navigation process in some embodiments for a user interacting with an existing tree-diagram associated with one of a survey, a simulation, and an intelligent tutoring system.

By way of example, FIG. 3 conceptually illustrates a user runtime tree-diagram navigation process 300 for a user interacting with an existing tree-diagram associated with one of a survey, a simulation, and an intelligent tutoring system. As shown in this figure, the user runtime tree-diagram navigation process 300 starts when the user selects (at 305) a "search" tool from a login menu. The user may select the search tool to access, for example, a communal library of simulations, surveys, and/or intelligent tutoring systems. In some embodiments, when the search tool is invoked, the user runtime tree-diagram navigation process 300 continues with the user inputting (at 310) a search term or terms. For example, the user may input a name of a survey, simulation, or intelligent tutoring system. Alternatively, the user may input the name of an author of such a survey, simulation, or intelligent tutoring system. The search tool is broad enough to accept any of a variety of input, including just a keyword or keywords that are related to a survey, a simulation, or an intelligent tutoring system. Whatever the input provided by the user, when or if a survey, a simulation, and/or an intelligent tutoring system is found by the user and selected, the user can begin. While this example use-case describes the steps of the user runtime tree-diagram navigation process 300 by reference to a simulation or an intelligent tutoring system (ITS), it is noted that a survey could have been similarly searched for and/or found. Therefore, for purposes of describing the user runtime tree-diagram navigation process 300, all references made to a simulation and/or an ITS can be understood to apply to a survey.

In some embodiments of the user runtime tree-diagram navigation process 300, after the search is completed, the user selects the desired simulation or ITS to load. Next, the user runtime tree-diagram navigation process 300 waits (at 320) for the selected simulation or ITS to load. When the simulation or ITS is loaded, then the user reads (at 325) the initial question or prompt of the selected simulation/ITS that is presently loaded. Next, the user chooses (at 330) a preferred response to the initial question or prompt. After the preferred response is chosen, then the user reads (at 335) the next question or prompt, and chooses (at 340) the preferred response.

In some embodiments, the user runtime tree-diagram navigation process 300 determines (at 345) whether there are more questions or prompts. When there are more questions or prompts, the user runtime tree-diagram navigation process 300 of some embodiments transitions back to the step at which the user reads (at 335) another question or prompt. On the other hand, when there are no more questions or prompts, then the user runtime tree-diagram navigation process 300 waits (at 350) for the exit page to load. When loaded, the user makes an exit page selection (at 355). Upon making the exit page selection, the user runtime tree-diagram navigation process 300 of some embodiments determines (at 360) whether there are any more search needs of the user. When the user wants to search for another simulation, survey, or ITS, then the user runtime tree-diagram navigation process 300 returns to the start for the user to select (at 305) the search tool. When no more simulation, survey, or ITS needs to be searched for, the user runtime tree-diagram navigation process 300 ends.

Figure 4:
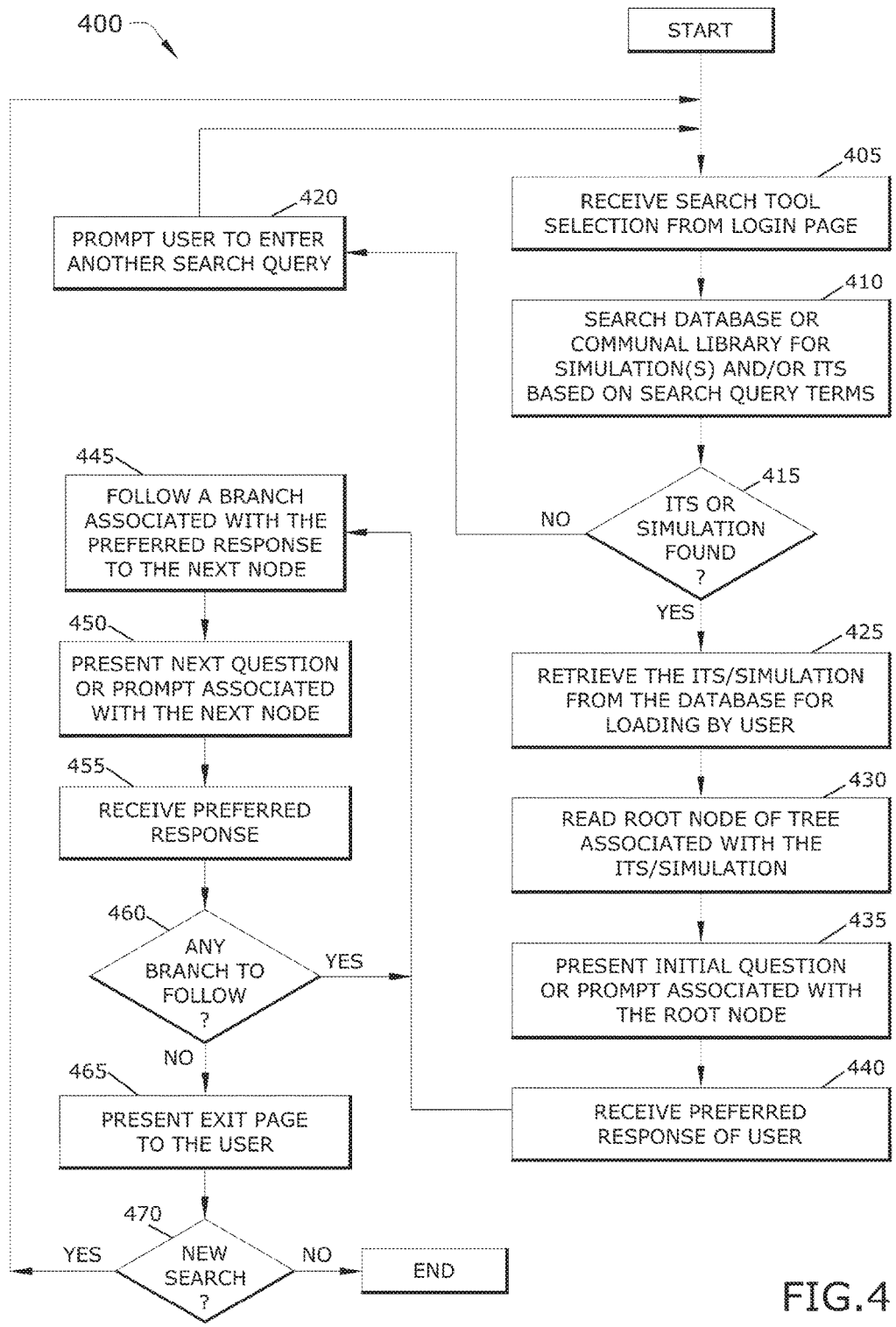
FIG. 4 conceptually illustrates a server-side runtime tree-diagram navigation process in some embodiments for navigating an existing tree-diagram in response to a user interacting with one of a survey, a simulation, and an intelligent tutoring system.

Now turning to the server-side operations when a user interacts with a survey, simulation, or ITS, FIG. 4 conceptually illustrates a server-side runtime tree-diagram navigation process 400 for navigating an existing tree-diagram in response to a user interacting with one of a survey, a simulation, and an intelligent tutoring system. In this figure, the server-side runtime tree-diagram navigation process 400 starts by receiving (at 405) a user selection of the search tool from the login page. As noted in the user runtime tree-diagram navigation process 300 described by reference to FIG. 3, the user selects the search tool to input a keyword, a name, an author, etc., in order to identify and load a survey, a simulation, and/or an ITS. However, on the server-side of things (or rather, on the application-side, when the software application which implements the runtime tree-diagram navigation process 400 is loaded into memory of a computing device and machine instructions of the software application are executed on a processing unit of the computing device), the user's search tool selection and search input are received. Next, the runtime tree-diagram navigation process 400 searches (at 410) the database or communal library for simulation(s), surveys, and/or ITS based on the search query inputs entered by the user.

In some embodiments, the server-side runtime tree-diagram navigation process 400 determines (at 415) whether a survey, ITS, or simulation is found matching the search query input. When no survey, ITS, or simulation is found that matches the search query input, then the server-side runtime tree-diagram navigation process 400 prompts (at 420) the user to enter another search query. Then the server-side runtime tree-diagram navigation process 400 returns to the start to receive (at 405) the search tool selection with the search criteria.

On the other hand, when a survey, a simulation, or an ITS is found during the search, then the server-side runtime tree-diagram navigation process 400 retrieves (at 425) the corresponding survey, simulation, or ITS from the database or the communal library for loading by the user. In some embodiments, when the tree diagram of the corresponding survey, simulation, or ITS is loaded, then the server-side runtime tree-diagram navigation process 400 reads (at 430) the root node of the tree. After reading the root node, the server-side runtime tree-diagram navigation process 400 presents (at 435) the initial question or prompt associated with the root node for the user to review/answer.

In some embodiments, the server-side runtime tree-diagram navigation process 400 receives (at 440) a preferred response of the user. The preferred response is, of course, the response selected by the user when prompted with the initial question from the root node. Next, the server-side runtime tree-diagram navigation process 400 follows (at 445) a branch associated with the preferred response to the next node. For example, the user may choose preferred answer A among choices A, B, and C for an initial question, where each of A, B, and C correspond to separate branches off of the root node, and which each lead to different secondary nodes, and ultimately, to separate subsequent nodes until completion of the survey, the simulation, or the ITS. Thus, after the server-side runtime tree-diagram navigation process 400 follows (at 445) the branch associated with the preferred response, it is following the only branch that corresponds to the response. In this manner, the user is driving the survey, the simulation, or the ITS by his or her own responses.

Next, the server-side runtime tree-diagram navigation process 400 of some embodiments presents (at 450) the next question or prompt associated with the node at the end of the branch it followed. After the user provides a response to the question or prompt, the server-side runtime tree-diagram navigation process 400 receives (at 455) the user's preferred response to this latest node-related question or prompt.

Again, the server-side runtime tree-diagram navigation process 400 determines (at 460) whether there are any branches off the present node to follow, based on the user's response. In some embodiments, the user's response to the present node may be an end point of the survey, simulation, or ITS, in which case there is no more branch to follow. In this case, the server-side runtime tree-diagram navigation process 400 presents (at 465) the exit page to the user. On the other hand, when there is a branch corresponding to the user's response to the present node, then the server-side runtime tree-diagram navigation process 400 follows (at 445) the branch associated with the preferred response to the next node (connected to the end of the followed branch), and thereafter presents the question or prompt associated with said node to the user. This process continues until at some point there is no branch to follow after the user provides a preferred response to a question/prompt of a node. At that point, the server-side runtime tree-diagram navigation process 400 presents (at 465) the exit page to the user. In some embodiments, the server-side runtime tree-diagram navigation process 400 determines (at 470) whether a new search is to be performed by the user. When a new search is selected by the user, then the server-side runtime tree-diagram navigation process 400 returns to the start. When no search is indicated, however, the server-side runtime tree-diagram navigation process 400 ends.

III. Tree-Diagram Design Interface GUI

Therefore, a specific (but not exclusive) use-case example of a user engaging with the tree-diagram design interface system and/or processes from start to finish, includes at least the following steps: (i) creating the name and tags for the survey, simulation, or intelligent tutoring system by selecting the cog icon, (ii) adding a node by using the plus icon and create the text and look (imagery and font) for the node by selecting the node and opening its options menu (represented by an icon with three horizontal lines), (iii) creating a new branch by selecting the outgoing arrow at the top of the node (each time the arrow is selected, it produces a new branch), (iv) adding the desired number of branches from the initial node and labeling each to represent the branch as a plausible response option in relation to the question or prompt presented in the previous node, (v) connecting each branch to another node (thereby modeling a logical sequence) by overlapping the incoming arrow of the node with the end of the branch, and (vi) repeating steps (ii) through (iv) until the scope of the scenario/topic under consideration has been adequately designed as a survey, a simulation, or an intelligent tutoring system. Once a survey, simulation, or intelligent tutoring system is complete, the user would save the survey, simulation, or intelligent tutoring system (e.g., by selecting the floppy disk icon), exit the design interface, and select to "publish" the survey, simulation, or intelligent tutoring system, thereby making it available in the shared library.

Figure 5:
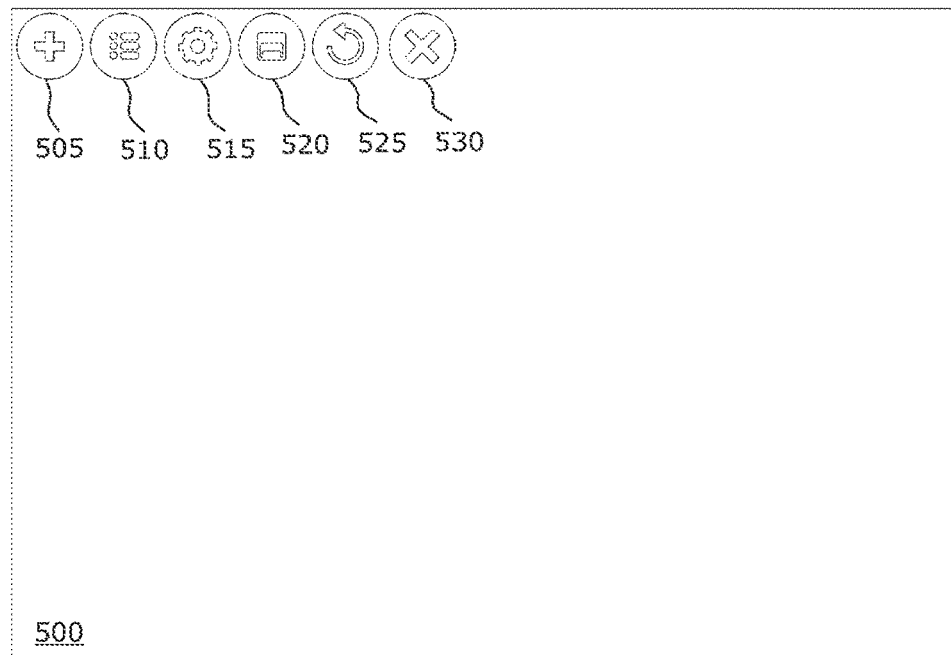
FIG. 5 conceptually illustrates a tree-diagram design interface that allows a user to create new tree-diagrams, view existing tree-diagrams, and update existing tree-diagrams that are associated with surveys, simulations, and intelligent tutoring systems.

By way of example, FIG. 5 conceptually illustrates a tree-diagram design interface 500 that allows a user to create new tree-diagrams, view existing tree-diagrams, and update existing tree-diagrams that are associated with surveys, simulations, and intelligent tutoring systems. As shown in this figure, the tree-diagram design interface 500 includes a plurality of icons that are associated with a plurality of tools for creating or modifying surveys, simulations, and intelligent tutoring systems in the design interface 500. Specifically, the plurality of icons include a new node icon ("+") 505 associated with a node creation tool, a customization icon ("=") 510 associated with a tree diagram element customization tool, a settings configuration icon ("¤") 515 associated with a settings configuration tool, a save to disk icon ("🖫") 520 associated with a tool to save a tree diagram, a refresh icon (curved arrow) 525 associated with a tree diagram reload tool, and a delete icon ("x") 530 associated with a tree diagram element deletion tool.

Figure 6:
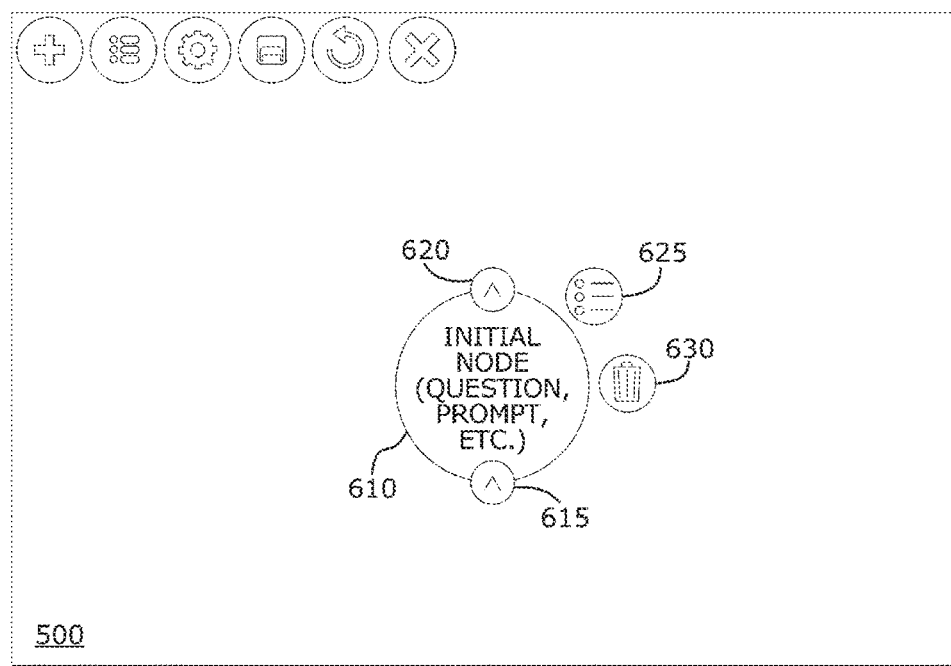
FIG. 6 conceptually illustrates a single node in the tree-diagram design interface of a new tree-diagram associated with one of a survey, a simulation, and an intelligent tutoring system.

Now turning to FIG. 6, which conceptually illustrates an initial node 610 in the tree-diagram design interface 500 of a new tree diagram associated with one of a survey, a simulation, and an intelligent tutoring system. The initial node 610 is displayed in response to a selection of the new node icon ("+") 505 which invokes the associated node creation tool to create the initial node 610 of the new tree diagram. The initial node 610, like all nodes created for tree diagrams in the tree-diagram design interface 500, relates to a question or a prompt of the survey, simulation, or intelligent tutoring system associated with the new tree diagram. A plurality of node-specific icons associated with a plurality of node-specific tools are displayed in relation to the initial node 610. Specifically, the plurality of node-specific icons includes an incoming branch connector icon 615, an outgoing branch connector icon 620, a node-specific customization icon 625, and a node trash can icon 630.

Additional nodes and branches are added directly or indirectly to the initial node 610, and customized settings can be made for any node or branch created in the tree diagram. This is accomplished by selections of icons in the tree-diagram design interface 500 or selections of icons connected to a node or a branch of the tree diagram. For example, a user can create a second node by selection of the new node icon ("+") 505. To create a branch between nodes, for example, the user may select the outgoing branch connector icon 620 and then connect the end of the new branch to the incoming branch connector icon 615 of the second node. On the other hand, the user may wish to make the second node the initial node for the survey, simulation, or intelligent tutoring system, in which case the user may select the outgoing branch connector icon 620 of the second node and connect the end of the new branch to the incoming branch connector icon 615 of the initial node (which would no long be considered the 'initial' node, but a 'child' node connected to the second node, which itself would thereafter be referred to as the 'initial' node).

Each time the user creates a new node or a new branch connecting two nodes, the user can customize the newly created tree element by selection of the customization icon ("=") 510 from the tree-diagram design interface 500 or by selection of the node-specific customization icon 625 (or branch-specific customization icon, when customizing a branch). While the node-specific customization icon 625 and the branch-specific customization icon invokes a node customization tool and a branch customization tool, respectively, the customization only applies specifically to the related node or branch. On the other hand, as the user continues to add new nodes and branches to the tree diagram, it is possible to highlight multiple nodes or multiple branches, and customize the lot of them by selection of the customization icon ("=") 510 from the tree-diagram design interface 500. In this manner, a user can easily make wholesale customized node or branch settings that apply en mass to different groups of related nodes and branches.

Figure 7:
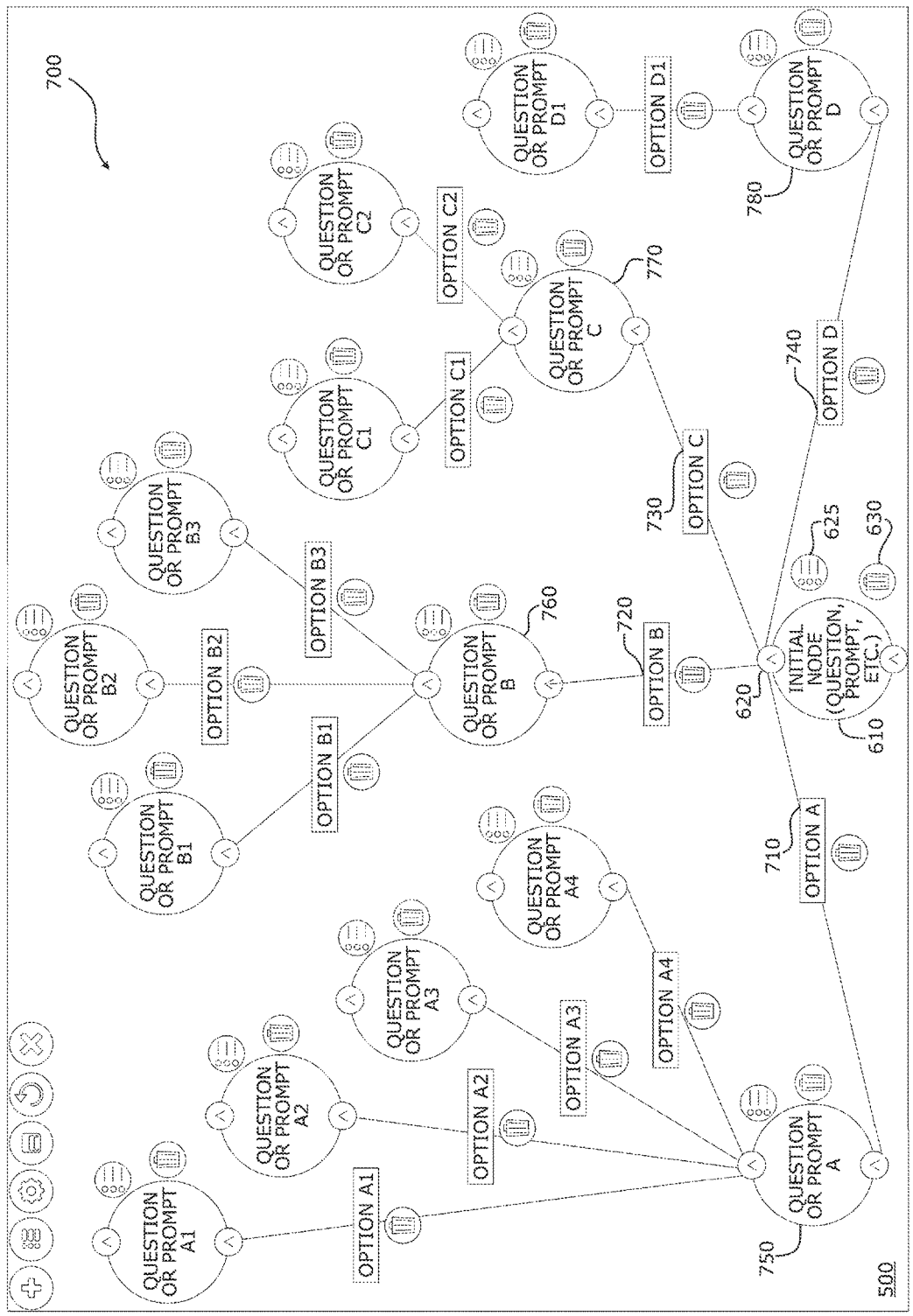
FIG. 7 conceptually illustrates a full tree-diagram in the tree-diagram design interface after completing a new or opening an existing tree-diagram associated with one of a survey, a simulation, and an intelligent tutoring system.

After all the nodes, branches, and customization of the elements in the tree diagram have been fully fleshed out with respect to the intended questions/prompts (nodes) and response options (branches) for the questions/prompts, etc., then a full tree-diagram is ready for publication as a survey, a simulation, or an intelligent tutoring system. By way of example, FIG. 7 conceptually illustrates a full tree diagram 700 in the tree-diagram design interface 500 which is associated with one of a survey, a simulation, and an intelligent tutoring system. As shown, the full tree diagram 700 includes the initial node 610 and its node-specific icon tools (i.e., the incoming branch connector icon 615, the outgoing branch connector icon 620, the node-specific customization icon 625, and the node trash can icon 630). A plurality of nodes are in direct connection with the initial node 610 by way of a plurality of branches that extend out of the outgoing branch connector icon 620 of the initial node 610. Specifically, the plurality of nodes in direct connection with the initial node 610 include node 'A' 750, node 'B' 760, node 'C' 770, and node 'D' 780. The plurality of branches that extend out of the outgoing branch connector icon 620 of the initial node 610 include branch 'A' 710 associated with response option 'A' and connecting to node 'A' 750, branch 'B' 720 associated with response option 'B' and connecting to node 'B' 760, branch 'C' 730 associated with response option 'C' and connecting to node 'C' 770, and branch 'D' 780 associated with response option 'D' and connecting to node 'D' 780.

In addition to the plurality of nodes in direct connection with the initial node 610 and the plurality of branches that extend out of the outgoing branch connector icon 620 of the initial node 610, the full tree diagram 700 in this figure includes several additional nodes and branches that are indirectly connected to the initial node 610. For purposes of explanation, however, it is sufficient to focus on the plurality of nodes in direct connection with the initial node 610. When a user engages and interacts with the survey, simulation, or ITS that is related to the full tree diagram 700, the path of questions/prompts that are presented demand on the user-provided responses to the initial question/prompt and all subsequent questions/prompts. Thus, for example, when presented with the question/prompt related to the initial node 610, several response options are presented to the user. The user can select one of the several response options and move forward. In this example, there are four response options arising from the question/prompt associated with the initial node 610. Specifically, the response options include response option 'A' associated with branch 'A' 710, response option 'B' associated with branch 'B' 720, response option 'C' associated with branch 'C' 730, and response option 'D' associated with branch 'D' 740.

Depending on which response option the user selects in response to the question/prompt of the initial node 610, the user will be presented with one of four different questions/prompts related to the four different nodes in direct connection with the initial node 610. The four questions/prompts include question/prompt 'A' for node 'A' 750, question/prompt 'B' for node 'B' 760, question/prompt 'C' for node 'C' 770, and question/prompt 'D' for node 'D' 780. Thus, when the preferred response of the user to the question/prompt associated with the initial node 610 is response option 'A', then the user is presented question/prompt 'A' from node 'A' 750. Similarly, when the preferred response is response option 'B', response option 'C', or response option 'D', then the user is presented question/prompt 'B' from node 'B' 760, question/prompt 'C' from node 'C' 770, or question/prompt 'D' from node 'D' 780, respectively.

Furthermore, node 'A' 750, node 'B' 760, node 'C' 770, and node 'D' 780 each have one or more response options from which the user can choose in response to the respective question/prompt of the associated node. Therefore, completing a survey, a simulation, or an intelligent tutoring system can be accomplished by several different users who interact with the survey, simulation, or ITS in different ways, and are presented different questions/prompts according to their own subsequent preferred responses.

As can be seen by the examples above, the tree-diagram design interface 500 makes the process of creating or modifying a survey, a simulation, or an intelligent tutoring system easy and intuitive. Additionally, having easy tools to customize nodes and modify tree elements allows for easy management of tree diagrams being created as well as existing full tree diagrams. In this way, a teacher, an educator, a designer, a content creation professional, or another interested party can quickly assemble and publish a survey, a simulation, an intelligent tutoring system, or other types of instructional step-through materials.

Figure 8:
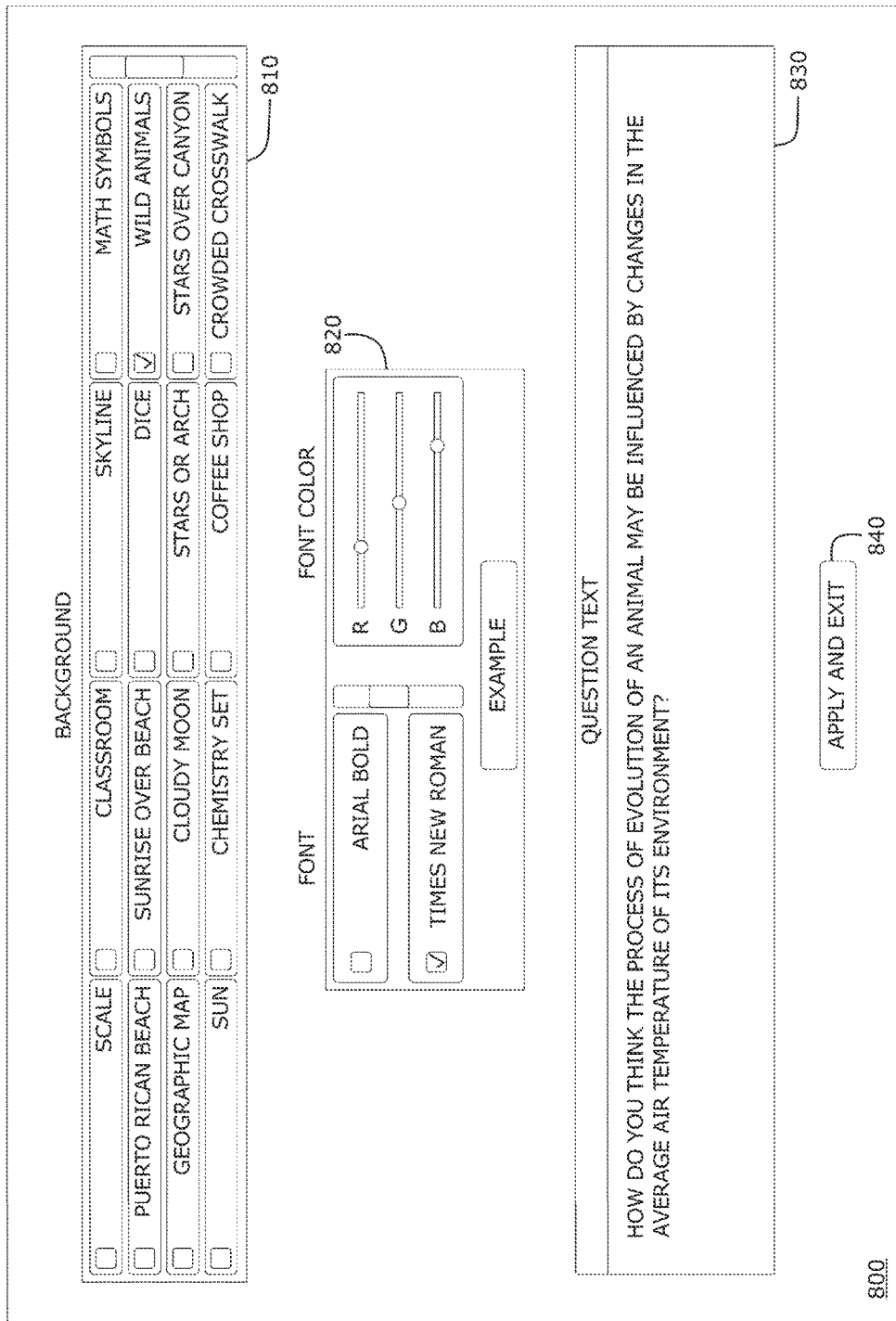
FIG. 8 conceptually illustrates node settings to apply to a node of a tree-diagram associated with one of a survey, a simulation, and an intelligent tutoring system.

By way of example, FIG. 8 conceptually illustrates a node customization interface 800 that allows a user to select node customization settings to apply to one or more nodes of a tree diagram associated with one of a survey, a simulation, and an intelligent tutoring system. As shown in this example, the node customization interface 800 includes a background image selection tool 810 from which the designer of the survey, simulation, or ITS can select a specific background for a particular node's question/prompt, a font selection/modification tool 820 that allows the designer to set a font type and color to apply to the text of the particular node's question/prompt, a question/prompt text entry field 830 in which the designer can type in the question/prompt to be presented to the end user, and an apply/exit button 840 to save the changes to the particular node and apply to the node's question/prompt when the end user runs the survey, the simulation, or the ITS.

Some embodiments of the tree-diagram design interface system and processes of the present disclosure could be adapted for use in creating any sort of tree-diagram dependent experience. As just a few examples, it could be used to create a rudimentary video game or academic or employment-related assessments. It could also be used to teach basic coding or computer programming literacy by virtue of the intuitive design interface that leverages tree-diagrams for content creation (i.e., the act of creating content helps a user better understand the nature of branch logic, which underpins much of modern day computing).

Also, some embodiments of the tree-diagram design interface system and processes could be adapted to facilitate the creation of two-dimensional maps that outline the scope and logical connections inherent in a given domain. Each simulation, as designed and observed in the design interface, can be considered a unique creation unto itself (i.e., a stand-alone tree-diagram).

The above-described embodiments of the invention are presented for purposes of illustration and not of limitation.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
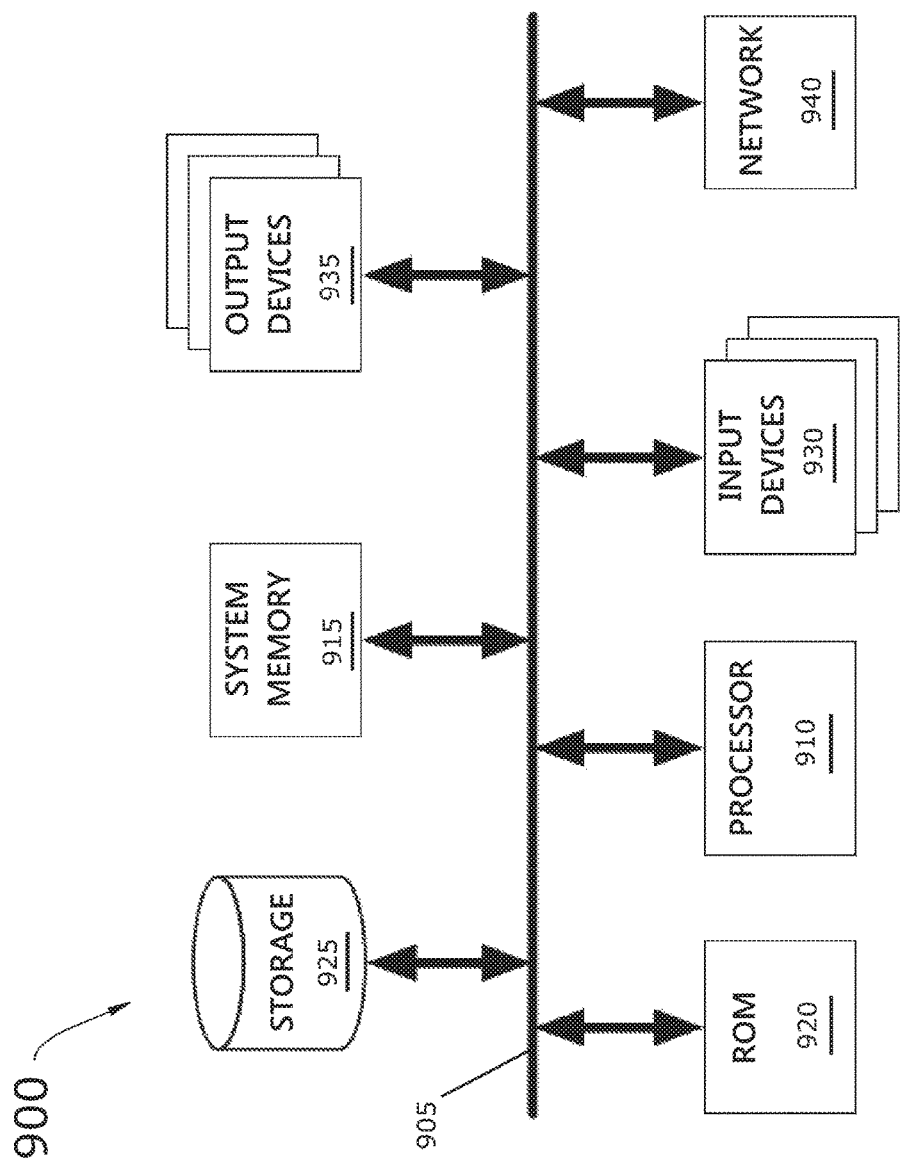
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer, phone, PDA, or any other sort of electronic device. Such an electronic system includes various types of computer readable media and interfaces for various other types of computer readable media. Electronic system 900 includes a bus 905, processing unit(s) 910, a system memory 915, a read-only 920, a permanent storage device 925, input devices 930, output devices 935, and a network 940.

The bus 905 collectively represents all system, peripheral, and chipset buses that communicatively connect the numerous internal devices of the electronic system 900. For instance, the bus 905 communicatively connects the processing unit(s) 910 with the read-only 920, the system memory 915, and the permanent storage device 925.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 925.

Other embodiments use a removable storage device (such as a floppy disk or a flash drive) as the permanent storage device 925. Like the permanent storage device 925, the system memory 915 is a read-and-write memory device. However, unlike storage device 925, the system memory 915 is a volatile read-and-write memory, such as a random access memory. The system memory 915 stores some of the instructions and data that the processor needs at runtime. In some embodiments, the invention's processes are stored in the system memory 915, the permanent storage device 925, and/or the read-only 920. For example, the various memory units include instructions for processing appearance alterations of displayable characters in accordance with some embodiments. From these various memory units, the processing unit(s) 910 retrieves instructions to execute and data to process in order to execute the processes of some embodiments.

The bus 905 also connects to the input and output devices 930 and 935. The input devices enable the user to communicate information and select commands to the electronic system. The input devices 930 include alphanumeric keyboards and pointing or cursor control devices. The output devices 935 display images generated by the electronic system 900. The output devices 935 include printers and display devices, such as cathode ray tubes (CRT) or liquid crystal displays (LCD). Some embodiments include a touchscreen that functions as both an input and output device.

Finally, as shown in FIG. 9, bus 905 also couples electronic system 900 to a network 940 through a network adapter (not shown). In this manner, the computer can be a part of a network of computers (such as a local area network ("LAN"), a wide area network ("WAN"), or an Intranet), or a network of networks (such as the Internet). Any or all components of electronic system 900 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-4 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a program which, when executed by a processor of a computing device, provides a tree-diagram design interface for creating surveys, simulations, and intelligent tutoring systems, said program comprising sets of instructions for:
    receiving a first tool selection of a node creation tool to create a new node in the tree-diagram design interface;
    adding the new node to the tree-diagram design interface;
    setting the new node as an initial node of a new tree diagram;
    receiving a second tool selection of the node creation tool to create a second node in the tree-diagram design interface;
    adding the second node to the tree-diagram design interface;
    receiving a third tool selection of a branch creation tool to create a first branch that connects the initial node to the second node;
    updating the new tree diagram to show the first branch connecting the second node to the initial node;
    visually outputting the updated new tree diagram in the tree-diagram design interface;
    receiving a fourth tool selection of the node creation tool to create a third node in the tree-diagram design interface;
    adding the third node to the tree-diagram design interface;
    detecting a selection of an incoming arrow icon on the second node in the updated new tree diagram;
    populating a list of incoming branches to the second node in the updated new tree diagram, said list of incoming branches comprising a first branch entry associated with the first branch;
    receiving a selection of the first branch entry from the list of incoming branches;
    disconnecting the first branch from the second node in the updated new tree diagram;
    connecting the first branch to the third node in the updated new tree diagram;
    detecting a selection of the second node in the updated new tree diagram;
    highlighting the second node in the updated new tree diagram;
    receiving a selection of a trash can icon associated with the highlighted second node; and
    eliminating the second node from the updated new tree diagram and the tree-diagram design interface.

2. The non-transitory computer readable medium of claim 1, wherein the program further comprises sets of instructions for:
    receiving a selection of a node customization tool related to the initial node; and
    customizing the initial node.

3. The non-transitory computer readable medium of claim 2, wherein the set of instructions for customizing the initial node comprises sets of instructions for:
    visually outputting a node customization interface comprising a plurality of node customization options;
    receiving a plurality of node settings for the plurality of node customization options in the node customization interface; and
    applying the plurality of node settings to the initial node.

4. The non-transitory computer readable medium of claim 2, wherein the set of instructions for customizing the initial node comprises a set of instructions for receiving a set of question text for a question/prompt.

5. The non-transitory computer readable medium of claim 4, wherein the program further comprises a set of instructions for receiving a set of response text to associate with the first branch.

6. The non-transitory computer readable medium of claim 4, wherein the set of instructions for customizing the initial node further comprises a set of instructions for receiving an image to display as a node icon.

7. The non-transitory computer readable medium of claim 1, wherein the program further comprises sets of instructions for:
    saving the new tree diagram; and
    publishing the saved tree diagram as a shared publication of page by page displays of information in a communal library of surveys, simulations, and intelligent tutoring systems.

8. The non-transitory computer readable medium of claim 7, wherein the shared publication comprises a survey of page by page displays of information that are presented to a survey taking user in a particular sequential trajectory of survey pages that is based on each survey page response made by the survey taking user.

9. The non-transitory computer readable medium of claim 7, wherein the shared publication comprises a simulation of page by page displays of information that are presented to a simulation taking user in a particular sequential trajectory of simulation pages that is based on each simulation page response made by the simulation taking user.

10. The non-transitory computer readable medium of claim 7, wherein the shared publication comprises an intelligent tutoring system (ITS) of page by page displays of information that are presented to an ITS taking user in a particular sequential trajectory of ITS pages that is based on each ITS page response made by the ITS taking user.

\* \* \* \* \*